United States Patent [19]
Dodson, III

[11] 3,872,329
[45] Mar. 18, 1975

[54] RADIATION SENSING CIRCUIT

[75] Inventor: George Bertram Dodson, III, Shirley, Mass.

[73] Assignee: RCA Corporation, New York, N.Y.

[22] Filed: Mar. 7, 1974

[21] Appl. No.: 448,826

[52] U.S. Cl. .............. 307/311, 250/206, 250/211 J, 250/555
[51] Int. Cl. .............. H03k 3/42, G01j 1/32
[58] Field of Search .......... 328/2; 307/311; 330/59; 250/206, 555, 211 J

[56] References Cited

UNITED STATES PATENTS 3,770,966 11/1973 Sagawa et al. .................. 250/205

OTHER PUBLICATIONS

Electronic Design, Vol. 11, 3/27/74, p. 49.

*Primary Examiner*—Michael J. Lynch
*Assistant Examiner*—B. P. Davis
*Attorney, Agent, or Firm*—H. Christoffersen; S. Cohen

[57] ABSTRACT

A phototransistor provides an output current via a circuit node to a current path. An operational amplifier connected at its non-inverting input terminal to ground and at its inverting input terminal to the node provides a feedback signal to the base of the phototransistor in a sense to establish the node at a virtual ground for maintaining the phototransistor output current equal to a fixed current withdrawn by the current path.

10 Claims, 3 Drawing Figures

RADIATION SENSING CIRCUIT

Photodetector circuits are useful in a variety of signal detection applications such as, optical character recognition, label scanning, shaft position encoding and digital data transmission. Numerous photo sensing elements are suitable for use in photodetector circuits such as photodiodes, photoresistors, photovoltaic devices, phototransistors, and photomultiplier tubes. Of these, phototransistors are particularly desirable in photodetector circuits because they perform the functions of both photo sensing and amplification in a single device and are operable with relatively low potential sources.

Biasing a phototransistor in a given photodetector application generally requires a consideration of one or more of the following phototransistor characteristics: optical saturation effects, noise figure dependence on source resistance and collector current, current gain dependence on collector current, frequency response dependence on load resistance, and circuit operating point stability. Further, the above characteristics are also dependent on one or more of the following operating parameters: collector-to-emitter potential, emitter current, load resistance and source (base) resistance.

In a given design, difficulty may arise in optimizing one or more of the phototransistor characteristics because of interactive relationships between two or more of the above operating parameters. In particular, a need exists for a phototransistor detector circuit in which the collector-to-emitter potential and the emitter current are adjustable independently of each other and of load resistance and source resistance for optimizing the phototransistor operating characteristics. A further need exists for a phototransistor detector circuit having stable direct current operating characteristics and independently adjustable frequency response characteristics for, as an example, simplified transmission line signal conditioning. The present invention is directed to meeting these needs.

A detector, in accordance with the present invention, includes a sensor responsive to a radiation input signal, an operating potential and a control signal for producing an output current. A circuit, responsive to the sensor output current, a reference current and a reference voltage supplies the control signal to the sensor and varies it in a sense to maintain the magnitude of the sensor output current substantially equal to that of the reference current while simultaneously maintaining the potential of a point in the sensor substantially equal in both magnitude and polarity to that of the reference potential. In accordance with a further aspect of the invention, the circuit may include frequency dependent elements for modifying a parameter of the control signal to produce a frequency dependent circuit transfer function.

The invention is illustrated in the accompanying drawings wherein like reference numbers designate like elements and in which.

Figure 1:
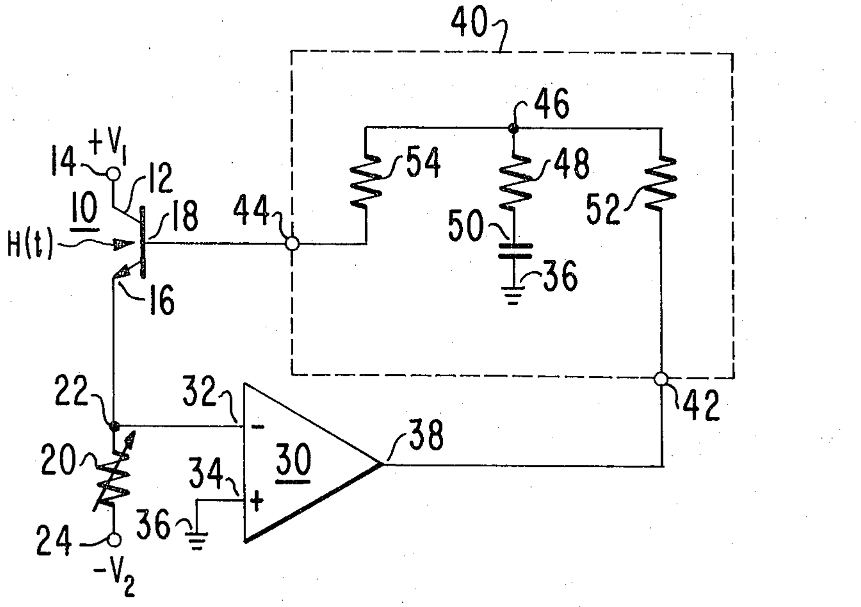
FIG. 1 is a circuit diagram of an embodiment of the invention.

The circuit of FIG. 1 comprises a phototransistor 10, a bias resistor 20, an operational amplifier 30 and a feedback network 40. Phototransistor 10 is connected at its collector 12 to input terminal 14, at its emitter 16 to circuit point 22 and at its base to output terminal 44 of feedback network 40. Operational amplifier 30 is connected at its inverting input terminal 32 to circuit point 22 which is connected to input terminal 24 by bias resistor 20 and at its non-inverting input terminal 34 to ground reference terminal 36. Output terminal 38 of amplifier 30 is connected to input terminal 42 of feedback network 40. Network 40 includes a circuit point 46 which is connected to ground 36 by serially connected resistor 48 and capacitor 50. Circuit point 46 is also connected to input terminal 42 by resistor 52 and to output terminal 44 by resistor 54.

In operation, positive and negative operating potentials, +V and −V, (relative to the potential of ground 36) are applied to terminals 14 and 24, respectively. Operational amplifier 30, being in a closed loop (negative feedback) configuration, maintains the potential of inverting input terminal 32 equal to that of non-inverting input terminal 34. Since terminal 34 is grounded, circuit point 22, being connected to inverting input terminal 32, is thus maintained at a virtual ground and no current flows to or from input terminal 32 other than the negligible bias current required by operational amplifier 30. (This is, typically, in the microampere range and may be neglected for practical purposes).

Since circuit point 22 is maintained at virtual ground, the collector-to-emitter voltage (Vce) of transistor 10 is determined solely by the operating potential $+V_1$ applied to input terminal 14. An advantage of this is that once an optimum value of Vce is determined in a given design, this value may be fixed by selection of a single parameter ($+V_1$) and is thereafter unaffected by changes in other parameters (such as radiation H or emitter current). Another advantage is that having selected a value of Vce for transistor 10 of greater than its saturation voltage, transistor 10 will operate in a non-saturated mode thus providing enhanced operating speed and avoiding the possibility of radiation induced (optical) saturation.

Optical saturation is avoided in the following way. Assume that intense radiation H is applied to transistor 10 which tends to increase its emitter current and the potential of virtual ground 22. This produces a negative feedback signal from amplifier 30 which, coupled by feedback network 40 to base 18, reduces the radiation sensitivity of transistor 10, thus returning its emitter current to its initial value and maintaining virtual ground 22 at its initial potential (ground).

Another effect of the establishment of a virtual ground at circuit point 22 is that the emitter current of transistor 10 is determined solely by the current withdrawn through resistor 20. The reason for this is that any value of emitter current supplied to circuit point 22 which differs from the current removed by resistor 20 tends to change the potential of inverting input terminal 32 of amplifier 30. As explained above, this produces a negative feedback signal from amplifier 30 which biases the base 18 of transistor 10 in a sense to return inverting input terminal 32 (and thus circuit point 22) to its initial value (ground). Thus, the emitter current (Ie) of transistor 10 always tends to be equal to that of resistor 20 which is independent of the collector-to-emitter voltage of transistor 10.

An advantage of independent control of Vce and Ie of transistor 30 is that these quantities may be optimized in a given case without regard to interactive relationships therebetween normally encountered in conventional photodetector circuit designs. A further advantage, previously mentioned, is that transistor 10 is prevented from being saturated by radiation H and this is true even for very small values of Ie and Vce. This cannot be achieved in conventional photodetector designs where one or the other of these parameters are dependent on radiation H.

A further aspect of having established a virtual ground at circuit point 22 is that, since transistor 10 has neither collector nor emitter resistors (note that resistor 20 does not operate as an emitter load as point 22 is at virtual ground), its actual load impedance is substantially zero ohms (assuming, of course, that potential $+V_1$ is supplied by a source having negligible impedance). Zero load impedance implies maximum bandwidth for transistor 10 since bandwidth varies inversely as load impedance. Of course the zero load impedance also implies that no signal can be derived from either the collector or emitter terminals of transistor 10.

The circuit output signal is derived from the feedback current produced by amplifier 10 in maintaining circuit point 22 at a virtual ground as radiation H is varied. This current, applied to base 18, varies inversely as radiation H varies and produces an output voltage across feedback network 40. In effect, feedback network 40 represents an effective load impedance for phototransistor 10 and the circuit elements thereof may be varied to obtain a desired voltage gain without affecting in any way Vce or Ie of transistor 10. This, again, is a great design simplification for once Vce and Ie have been selected, the equivalent load impedance (network 40) may be designed without regard to interactive relationships between it and Vce and Ie.

Two further aspects of feedback network 40 are that it determines both the equivalent source impedance for base 18 of transistor 10 and many of the overall transfer characteristics of the photodetector circuit. The former is an important consideration in biasing transistor 10 for low noise operation. The latter is an important consideration with regard to the circuit steady state gain, frequency response, drift and other transfer function variables. Details of these aspects are described below, first with regard to the simplest form of feedback element, a resistor (FIG. 2) and then with regard to the more complex network 40 of FIG. 1.

Figure 2:
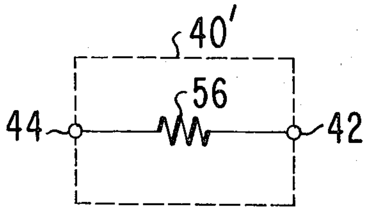
FIGS. 2 and 3 are circuit diagrams illustrating modifications of the circuit of FIG. 1.

Referring simultaneously to FIGS. 1 and 2, assume that network 40' of FIG. 2 is substituted for network 40 of FIG. 1 so that the feedback circuit of FIG. 1 consists only of a single resistor 56 connected between base 18 of transistor 10 and output terminal 38 of amplifier 30. Neglecting the effects of base-to-emitter voltage drop (Vbe) and common emitter input impedance of transistor 10, network 40' (which includes only resistor 56) has a frequency independent linear transfer function (output current vs. input voltage). The overall circuit transfer function, defined in terms of radiation induced photo-base input current (a characteristic of phototransistor 10) vs. output voltage at output terminal 36, is inversely related to the network transfer function because of the negative feedback effects previously discussed. Since the network transfer function is inversely related to the resistance of resistor 56, the output voltage at terminal 38 is thus directly related to the product of the photobase current and the value of resistor 56 and, since resistor 56 is not frequency dependent, the circuit transfer function is also frequency independent.

Resistor 56 thus serves as an effective load impedance for phototransistor 10 and additionally determines the source impedance for the base of transistor 10. This is an unfortunate situation when one is interested in designing a photodetector circuit having both high gain and low noise characteristics for two reasons. The first is that high detector gain requires a high value of feedback impedance while minimum noise figure for typical phototransistors occurs at somewhat lower impedance levels. Thus, conflicting requirements are placed on resistor 56 in terms of gain and noise figure. The second reason is that, for practical operational amplifiers in this configuration, drift is directly related to the value of resistor 56. Again, a conflict exists, here between gain and drift. These conflicts are resolved by feedback network 40 of FIG. 1 which includes several elements which may be varied to achieve minimum noise figure, low drift and high gain for alternating current signals.

In feedback network 40, under static (steady state) signal conditions, the impedance of capacitor 50 is relatively high (being limited by its leakage resistance value) so that the path between circuit point 46 and ground 36 through resistor 48 is essentially an open circuit. Neglecting the effects of the base-to-emitter voltage drop (Vbe) and common emitter input impedance of transistor 30, the equivalent feedback resistance for the purpose of gain determination, noise figure, and drift is, therefore, given by the sum of the values of resistors 52 and 54. For low noise figure and low drift, the sum of these resistor values should be relatively small (in most cases a few kilohms). This results, of course, in a relatively low direct current gain.

The function of capacitor 50 is to provide increased gain for time varying signals while resistor 48 limits this gain to a maximum value to prevent saturation of amplifier 30. Assume, for example, that radiation H is a time varying function of a defined frequency. Assume also that the reactance of capacitor 50 at this frequency is negligible compared to the value of resistor 52 and that resistor 48 has a value of zero ohms. In this case, resistors 52 and 48 and capacitor 50 form a voltage divider effectively reducing negative feedback for alternating current signals from amplifier 30 to transistor 10. In the limit, where substantially no alternating current feedback occurs, the circuit gain increases to that determined by the product of the open loop gain of amplifier 30 and the photobase current gain of transistor 10. Since the net gain will generally be quite large (for example, in excess of 100 db) amplifier 10 may saturate for relatively small changes in the radiation level. This effect is avoided completely and the circuit gain stabilized at a mathematically predictable value by the addition of resistor 48 (which had been assumed to be of zero ohms).

Resistor 48, in effect, provides a limiting value of attenuation for feedback network 40. This results because for high frequency signals, where the reactance of capacitor 50 is negligible, resistors 52 and 48 form a voltage divider having a fixed value of maximum attenuation. Since the closed loop gain is inversely related to the attenuation characteristics of network 40 the maximum closed loop gain is thus limited.

Viewed another way, network 40 is basically a low pass filter having a fixed value of maximum attenuation. It has a first break frequency at which attenuation begins and a second higher break frequency at which attenuation approaches a limiting value. There are, of course, many other types of filters having the above characteristics which are suitable for use as feedback network 40 and the particular network illustrated is not meant to exclude those others. For example, the network may include series inductors rather than a shunt capacitor or it may be in the form of a $\pi$ rather than a T configuration.

Figure 3:
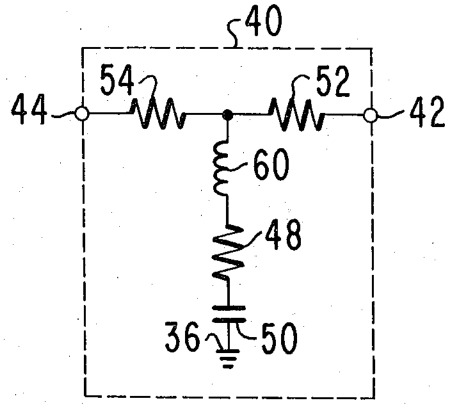

FIG. 3 illustrates a modification of feedback network 40 in which an additional element, inductor 60, is connected in series with resistor 48 and capacitor 50 between circuit point 46 and ground 36. For the reasons described below, this modification provides a band pass characteristic for the overall circuit which is useful in reducing noise where the signal H(t) is a bandwidth limited function.

Operation of the detector circuit of FIG. 1, thus modified, is as follows. As previously discussed, the circuit transfer function is inversely related to the attenuation characteristics of feedback network 40. As modified, this network passes all signals above and below first and fourth break frequencies respectively, while attenuating at a limiting value all signals between second and third break frequencies. It is thus a band stop filter and has a fixed maximum value of attenuation in the stop band. (This maximum, as in the previous example, may be determined by appropriate selection of the value of resistor 48). Thus, for the reasons previously discussed, the overall circuit has a band pass characteristic of fixed maximum gain with unity gain outside the pass band. The advantage of this is that where the signal to be detected (H(t)) is of limited bandwidth, the detector may have an equal band-width to achieve low noise operation.

Although the term ground has been herein used for convenience of expression it will be appreciated that the potential thereof may, in fact, be at a non-zero reference level. Also, although the circuit has been illustrated as employing a phototransistor as a radiation sensing element, other suitable sensing elements may be employed instead. Further, although only a limited number of examples of feedback networks have been given, other suitable networks may be used in practicing the invention provided they produce an output signal at least for direct current input signals.

What is claimed is:

1. In combination:

a circuit node;

a radiation sensor having a control terminal to which a control signal may be applied for adjusting the radiation sensitivity of said sensor and having also an output current path connected to said node for supplying an output current thereto, said output current being proportional to the intensity of radiation applied to said sensor at a given control signal level applied to said control terminal;

a second current path connected to said circuit node for withdrawing from said node a fixed current level, said second current path accepting the current supplied to said node by said output current path;

circuit means for supplying said control signal to said sensor and for maintaining said circuit node at a given virtual reference voltage level, said circuit means including means responsive to any tendency for the current level in said output current path to change, for changing the value of the control signal in a sense to return the flow of current in said output current path to its original value; and low pass filter means for initially receiving said control signal produced by said circuit means, attenuating said control signal and applying the attenuated control signal to said sensor, said low pass filter means having a first and a second, higher, break frequency and providing minimum attenuation of said control signal at frequencies below said first break frequency and a fixed maximum value of attenuation of said control signal at frequencies above said second break frequency.

2. The combination recited in claim 1 wherein said radiation sensor comprises:

a phototransistor having emitter, base and collector electrodes, said collector electrode for receiving a first operating potential, said base electrode for receiving said control signal from said low pass filter means, said emitter electrode for supplying said output current to said node whereby the collector-to-emitter voltage of said phototransistor is maintained equal to the potential difference between said first operating potential and the potential of said virtual reference voltage and the emitter current is maintained equal to said fixed current level withdrawn from said node by said second current path.

3. The combination recited in claim 2 wherein said circuit means comprises:

a differential amplifier having an inverting input terminal, a non-inverting input terminal and an output terminal, said inverting input terminal being connected to said node, said non-inverting input terminal being maintained at said given reference voltage level, said output terminal for producing said control signal and supplying said control signal to said low pass filter means.

4. The combination recited in claim 3 wherein said low pass filter means comprises:

a circuit node;

a first resistor connected between said output terminal of said differential amplifier and said node;

a second resistor connected between said base electrode of said phototransistor and said node; and a third resistor and a capacitor connected in series between said node and a signal ground reference point.

5. The combination recited in claim 1 further comprising means in said low pass filter means for producing a band rejection filter response having said fixed maximum value of attenuation for control signal frequencies above said second break frequency and below a third break frequency, said third break frequency being higher than said second break frequency.

6. The combination recited in claim 3 wherein said second current path comprises:

a terminal for receiving a second operating potential; and a further resistor connected between said terminal and said node, said first and second operating potentials being of opposite polarity taken with respect to said given reference voltage level.

7. In combination:

a differential amplifier having inverting and non-inverting input terminals and an output terminal, said non-inverting terminal being maintained at a reference potential;

first means for applying a bias signal of one sense to said inverting input terminal;

radiation responsive means for applying a further bias signal of opposite sense to said inverting terminal, the magnitude of said further bias signal being representative of a radiation input signal and a control signal supplied to said radiation responsive means; and filter means for supplying said control signal to said radiation responsive means in response to an output signal produced at said output terminal of said differential amplifier said filter means having a first and a second, higher, break frequency and providing minimum attenuation of said control signal at frequencies below said first break frequency and a fixed maximum value of attenuation of said control signal at frequencies above said second break frequency.

8. The combination recited in claim 7 wherein said first means comprises:

a first terminal for receiving a first operating potential; and a resistor connected between said first terminal and said inverting input terminal of said differential amplifier.

9. The combination recited in claim 7 wherein said filter means further comprises:

circuit means for producing a band-rejection filter characteristic providing attenuation of said control signal in a selected band of frequencies above said second break frequency and below a third break frequency, the value of said attenuation being limited to said fixed maximum value.

10. The combination recited in claim 7 wherein said radiation responsive means comprises:

a phototransistor having emitter base and collector electrodes, said emitter being connected to said inverting input terminal of said amplifier, said base corresponding to said point in said radiation responsive means and said collector for receiving a second operating potential; and wherein said first and second operating potentials are of opposite polarity taken with respect to said reference potential.

* * * * *